UNITED STATES PATENT OFFICE.

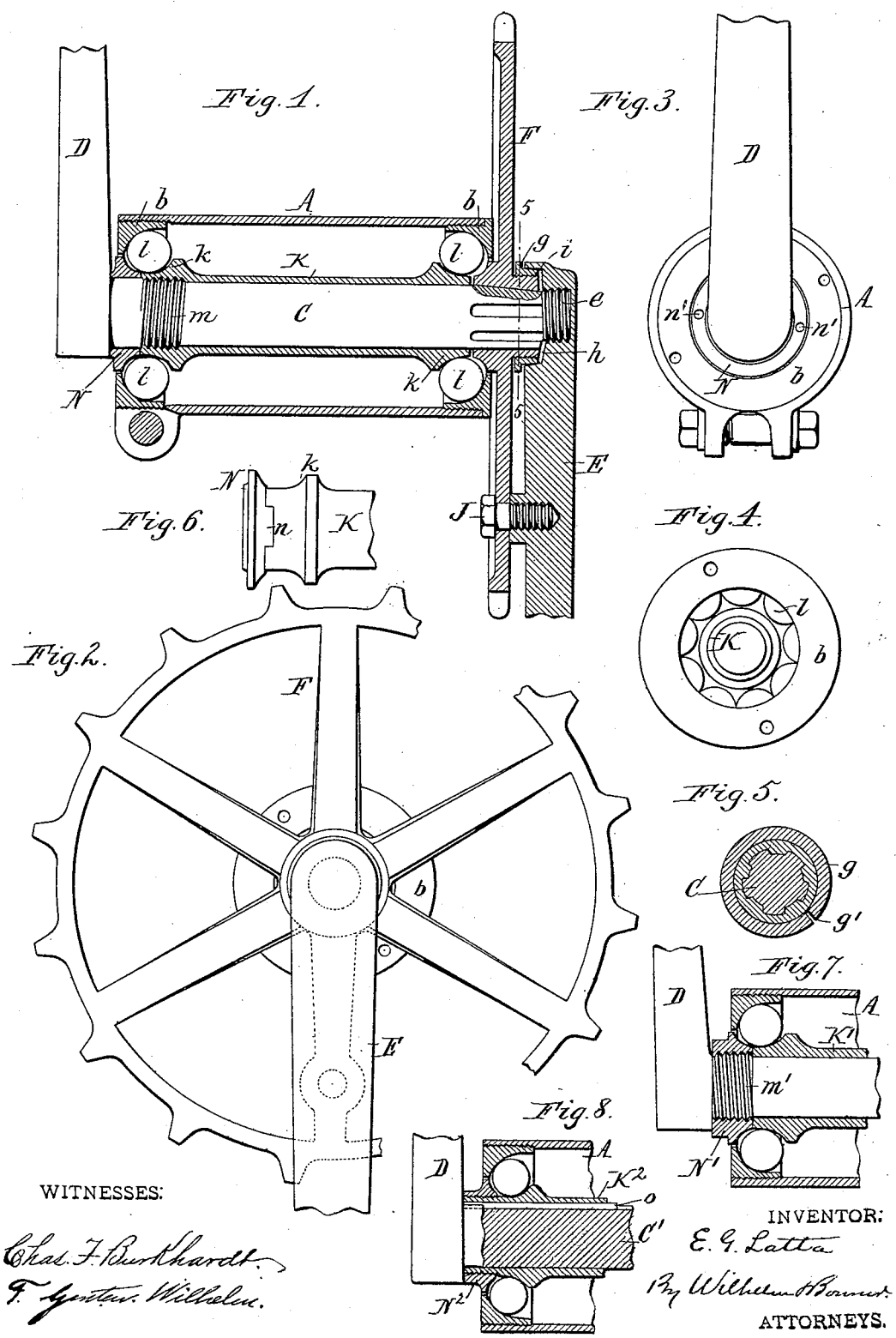

EMMIT G. LATTA, OF FRIENDSHIP, NEW YORK.

VELOCIPEDE CRANK-SHAFT.

SPECIFICATION forming part of Letters Patent No. 640,573, dated January 2, 1900.

Application filed September 23, 1896. Serial No. 606,737. (No model.)

*To all whom it may concern:*

Be it known that I, EMMIT G. LATTA, a citizen of the United States, residing at Friendship, in the county of Allegany and State of New York, have invented a new and useful Improvement in Velocipede Crank-Shafts, of which the following is a specification.

This invention relates more especially to that class of crank-shafts for velocipedes in which one of the cranks is formed integral with the shaft or permanently fastened thereto, while the other crank is detachably secured to the shaft.

The objects of my invention are to produce a simple construction of the crank-shaft and the parts mounted thereon which combines lightness with a close build, to effect a reliable connection of the several parts without the use of keys or other projecting parts, to facilitate the detachment or separation of the parts, and to so construct the bearings that they may be inspected without disturbing their adjustment.

In the accompanying drawings, Figure 1 is a sectional elevation of the crank-shaft and adjacent parts. Fig. 2 is a side elevation of the sprocket-wheel and the crank-shaft hanger. Fig. 3 is a similar view of the opposite end of the hanger. Fig. 4 is a view of the right-hand end of the hanger with the crank-shaft and the sprocket-wheel removed. Fig. 5 is a vertical cross-section in line 5 5, Fig. 1. Fig. 6 is a detached elevation of the left-hand end of the bearing-sleeve and its locking-collar. Fig. 7 is a fragmentary sectional elevation showing a modified construction of the bearing-sleeve and its locking-collar. Fig. 8 is a similar view of another modification.

Like letters of reference refer to like parts in the several figures.

A is the crank-shaft hanger or bracket, which may be of the usual cylindrical form and which is provided at its ends with the bearing-cups $b$.

C is the crank-shaft, and D the left-hand crank, which is preferably forged in one piece with the shaft. The opposite crank E is detachably secured to the adjacent end of the crank-shaft by an external screw-thread $e$, formed on the reduced end of the shaft and engaging with an internally-threaded socket or opening formed near the inner end of said crank, as shown in Fig. 1.

F is the sprocket or driving wheel, which is mounted on the crank-shaft between the detachable crank E and the adjacent end of the hanger A. The portion of the shaft which receives the hub of the sprocket-wheel is made of angular or other suitable cross-section, and the bore of the sprocket-wheel hub is correspondingly shaped, so that the wheel is firmly locked upon the shaft when forced into its place. In the construction shown in the drawings the shaft is ribbed or corrugated and tapered for this purpose.

$g$ is an adjustable collar or stop arranged between the hub of the sprocket-wheel and the adjacent crank. This stop-collar extends into a socket or depression $h$, formed in the inner side of said crank, and is provided with an internal screw-thread engaging with an external thread $i$ on the hub of the sprocket-wheel. This stop-collar is preferably split, as shown at $g'$ in Fig. 5, and tapered on its outer surface, as shown in Fig. 1, and the socket $h$ of the crank is correspondingly tapered, so that the collar is compressed and firmly clamped in place upon tightening the crank E.

J is a bolt which connects the detachable crank with the adjacent arm or web of the sprocket-wheel. The arm of the sprocket-wheel through which the bolt J passes is preferably enlarged, as shown by dotted lines in Fig. 2. This bolt prevents loosening of the detachable crank in back-pedaling and transmits a large portion of the driving strains directly from this crank to the sprocket-wheel.

K is the bearing-sleeve, which loosely surrounds the crank-shaft, and $k\,k$ are the bearing-cones mounted on the ends of the sleeve, these cones being preferably formed integral with the sleeve, although they may be separate therefrom and firmly secured thereto, if desired. $l$ represents the balls interposed between the cones $k$ and the cups $b$. The bearing-sleeve is provided at its left-hand end with an internal screw-thread, preferably a left-hand thread, which engages with a corresponding external thread $m$, formed on the crank-shaft.

N is a shifting ring or collar which is arranged loosely on the crank-shaft between the left-hand crank and the adjacent end of the bearing-sleeve and which is detachably interlocked with the screw-threaded end of the bearing-sleeve by a tenon and groove formed on the respective parts, as shown at $n$ in Fig. 6, or by any other suitable means, so that the sleeve is compelled to turn with the collar or held against rotation by holding the collar. The collar is provided in its outer face with a pair of diametrically opposite holes $n'$, adapted to receive a pin-wrench for turning it or holding the same and the sleeve against turning.

In assembling the parts the bearing-cups $b$, the bearing-sleeve K, and the balls $l$ are first put in place in the crank-shaft hanger, after which the collar N is placed into the open outer end of the left-hand bearing-cup and interlocked with the bearing-sleeve, as shown in Fig. 6. The crank-shaft is next passed through the collar N and into the bearing-sleeve until the screw-threaded portion $m$ of the shaft arrives at the left-hand end of the sleeve. The collar is now held stationary, and the shaft is screwed into the sleeve until the left-hand crank abuts against the collar, when the bearing-sleeve is effectually held against both rotary and endwise movement on the shaft. If desired, this operation may be reversed by holding the shaft and turning the collar. The adjustable collar $g$ is next screwed upon the hub of the sprocket-wheel, the latter is passed over the right-hand end of the shaft, and the right-hand crank is then screwed upon the end of the shaft until the sprocket-wheel is firmly forced to its seat. After thus screwing the detachable crank home the same will rarely be found to stand in the proper position with reference to the opposite crank, and in order to cause the crank to stop at the proper point in applying it to the shaft and at the same time bear firmly against the sprocket-wheel the stop-collar $g$ is employed. In case the detachable crank when tightened does not stand in the same plane as the permanent crank, it is only necessary to unscrew the adjustable collar $g$ sufficiently to arrest the crank at the proper point. After tightening the crank the same is fastened to the sprocket-wheel by the bolt J. To detach the parts, the bolt J is first removed, the detachable crank is unscrewed from the shaft, and the collar N is then held by a wrench and the shaft is unscrewed from the bearing-sleeve. This causes the crank-shaft to be shifted toward the left, drawing the hub of the sprocket-wheel against the sleeve and forcing the sprocket-wheel from its seat on the shaft without the use of special tools and without liability of defacing any of the parts. During the longitudinal movement of the crank-shaft the sleeve is held against endwise movement by the bearings, and as the sleeve is held against turning the rotation of the shaft causes the latter to move away from the hub of the sprocket-wheel sufficiently to loosen the hub and permit its easy detachment. By this movement the shaft is also partly withdrawn from the sleeve, so that the shaft and the collar N can be removed. After removing these parts the balls are exposed at both ends of the shaft-hanger and appear as shown in Fig. 4, permitting their inspection without requiring the bearing-cups to be detached or otherwise disturbed.

By connecting the bearing-sleeve and the shaft by means of a left-hand screw-thread the friction of the bearings prevents the sleeve from shifting against the hub of the sprocket-wheel, which would occur if a right-hand screw-thread were employed. Sufficient space is left between the sprocket-wheel hub and the adjacent end of the bearing-sleeve to permit the requisite lateral movement of the sprocket-wheel for properly adjusting the same to the shaft. The bearing-sleeve does not extend throughout the length of the hanger; but its ends terminate at a distance from the ends of the hanger.

The openings of the bearing-cups are larger than the crank-shaft and the collar N occupies the annular space between the crank-shaft and the adjacent bearing-cup. The space between the opposite bearing-cup and the crank-shaft is filled by the hub of the sprocket-wheel, which is extended inwardly into the cup, as shown in Fig. 1. This construction affords a long bearing for the hub on the shaft and at the same time permits the use of a comparatively short shaft with a comparatively long distance between the bearing-cups.

In the modified construction of my improvement shown in Fig. 7 the bearing-sleeve K' has a smooth or unthreaded bore, and the collar N' is provided with an internal right-hand thread, which engages with a corresponding external thread $m'$, formed on the shaft. The collar is interlocked with the bearing-sleeve, as in the first-described construction, so that these parts turn or remain at rest together. In assembling the parts of the modification after the detachable crank and the sprocket-wheel have been applied to the shaft the collar N' is screwed inwardly until the right-hand end of the sleeve bears against the hub of the sprocket-wheel, the collar remaining in position by the friction of the bearing.

In both of the constructions described the sleeve is caused to turn with the shaft and is normally held against longitudinal movement on the shaft, the sleeve operates to loosen the sprocket-wheel in disconnecting the parts, and the collar which interlocks with the sleeve can be detached from the sleeve to expose the bearings for inspection.

In the modification shown in Fig. 8 the shifting collar or nut $N^2$ engages with an external screw-thread formed on the end of the bearing-sleeve $K^2$, and the sleeve is held against turning on the crank-shaft C' by a feather or spline $o$ or other suitable means. In detaching the parts of this modified construction after the detachable crank has been removed the nut $N^2$ is unscrewed, which causes the same to bear against the boss of the permanent crank, thereby forcing the shaft toward the left, drawing the sprocket-wheel hub against the opposite end of the sleeve and forcing the hub from its seat on the shaft.

I claim as my invention—

1. The combination with a crank-shaft and a sprocket-wheel hub interlocking therewith, of a detachable crank engaging with the end of the crank-shaft by a screw-thread and operating to force the sprocket-wheel hub upon its seat, an adjustable stop interposed between the crank and the sprocket-wheel hub, and means for connecting the detachable crank with the sprocket-wheel, substantially as set forth.

2. The combination with a crank-shaft and a sprocket-wheel hub interlocking therewith, of a screw-threaded stop-collar engaging with the hub of the sprocket-wheel, a detachable crank engaging with the end of the crank-shaft, by a screw-thread and bearing against said stop-collar and means for connecting the detachable crank with the sprocket-wheel, substantially as set forth.

3. The combination with a crank-shaft and a sprocket-wheel hub interlocking therewith and provided with an external screw-thread, of a tapering screw-threaded stop-collar engaging with said hub, a detachable crank engaging with the end of the crank-shaft by a screw-thread and having a tapering seat which bears against said stop-collar and means for connecting the detachable crank with the sprocket-wheel, substantially as set forth.

4. The combination with a crank-shaft provided at one end with a permanent crank and at its opposite end with a detachable crank and a detachable sprocket-wheel hub, of a cone-sleeve mounted on the shaft and held against endwise movement in its bearings and adapted to abut against the hub, and a shifting-collar arranged on the inner side of the permanent crank and engaging with the sleeve to shift the shaft in the sleeve, substantially as set forth.

5. The combination with a crank-shaft having a permanent crank at one end and a detachable crank and sprocket-wheel hub at its opposite end, of a cone-sleeve arranged on the crank-shaft, held against endwise movement in its bearings and engaging with the shaft by a screw-thread, and a shifting-collar arranged on the shaft between the permanent crank and the adjacent end of the cone-sleeve and interlocking with the sleeve, substantially as set forth.

6. The combination with a crank-shaft and a hanger or bracket, of bearing-cups arranged in the ends of the hanger and separated from the shaft by an intervening annular opening or space, a bearing-sleeve mounted on the shaft between said cups, and a detachable collar arranged on the shaft at one end of the hanger and fitting into the opening between the shaft and the adjacent bearing-cup, said collar being separate from said bearing-sleeve, whereby the collar can be removed with the shaft without disturbing the bearings, substantially as set forth.

7. The combination with a crank-shaft and a hanger or bracket, of bearing-cups arranged in the ends of the hanger and separated from the crank-shaft by an intervening annular space, a bearing-sleeve mounted on the shaft and terminating at a distance from the ends of the hanger, a sprocket-wheel hub mounted on one end of the shaft and fitting into the space between the adjacent bearing-cup and the shaft and a removable collar arranged on the opposite end of the shaft and fitting into the space between the shaft and the adjacent bearing-cup, substantially as set forth.

Witness my hand this 17th day of September, 1896.

EMMIT G. LATTA.

Witnesses:
A. B. VORHIS, Jr.,
C. J. RICE.